July 18, 1967 R. F. WINOGROCKI ETAL 3,331,932
COMBINED DIRECTION SIGNAL AND AUXILIARY SWITCH CONSTRUCTION
Filed July 12, 1965 2 Sheets-Sheet 1

INVENTORS.
Ray F. Winogrocki
Nelson A. Taylor
John P. Langan
BY
Learman & McCulloch
ATTORNEYS

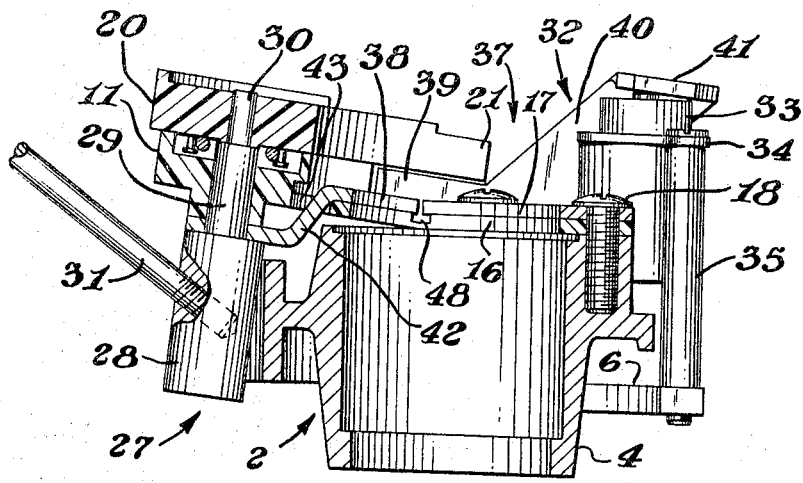
Fig. 3
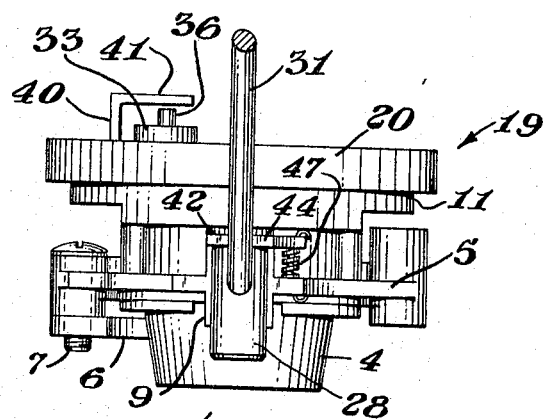
Fig. 4
Fig. 5
INVENTORS.
Ray F. Winogrocki
Nelson A. Taylor
John P. Langan
BY
Learman & McCulloch
ATTORNEYS

United States Patent Office 3,331,932
Patented July 18, 1967

3,331,932
COMBINED DIRECTION SIGNAL AND AUXILIARY SWITCH CONSTRUCTION
Ray F. Winogrocki, East Detroit, Nelson A. Taylor, Taylor, and John P. Langan, Detroit, Mich., assignors to Boyne Products, Inc., Detroit, Mich., a corporation of Michigan
Filed July 12, 1965, Ser. No. 471,085
9 Claims. (Cl. 200—61.34)

This invention relates to electrical switch constructions and more particularly to a switch especially adapted for use in controlling direction signal indicators for motor vehicles and which also is capable of controlling some other electrical apparatus such as the vehicles' high beam head lamps.

It is currently common practice for automotive manufacturers to mount direction signal operating means on the steering column of a vehicle adjacent the steering wheel and to provide a switch on the floor of the vehicle for controlling the high beam head lamps. One of the principal objects of this invention is to provide a switch construction which is capable of performing both of the functions of direction signal control and head lamp high beam control.

Another object of the invention is to provide a switch construction of the character described which is capable of performing either of its functions independently of the other and without regard to whether or not either one of the switches is in an active or inactive position.

A further object of the invention is to provide such a dual switch construction and which does not necessitate any significant modification of the vehicle's steering column, direction signal or head lamp circuitry.

Another object of the invention is to provide a dual switch of the character referred to and in which the operation and reliability of neither electrical device is impaired.

Other objects and advantages of the invention will be pointed out specifically or will become apparent from the following description when it is considered in conjunction with the appended claims and the accompanying drawings, in which:

FIGURE 3 is a view similar to FIGURE 2, but illustrating the switch in an active position;

FIGURE 4 is an end elevational view of the apparatus; and

FIGURE 5 is a perspective view of a portion of the apparatus.

Figure 1:
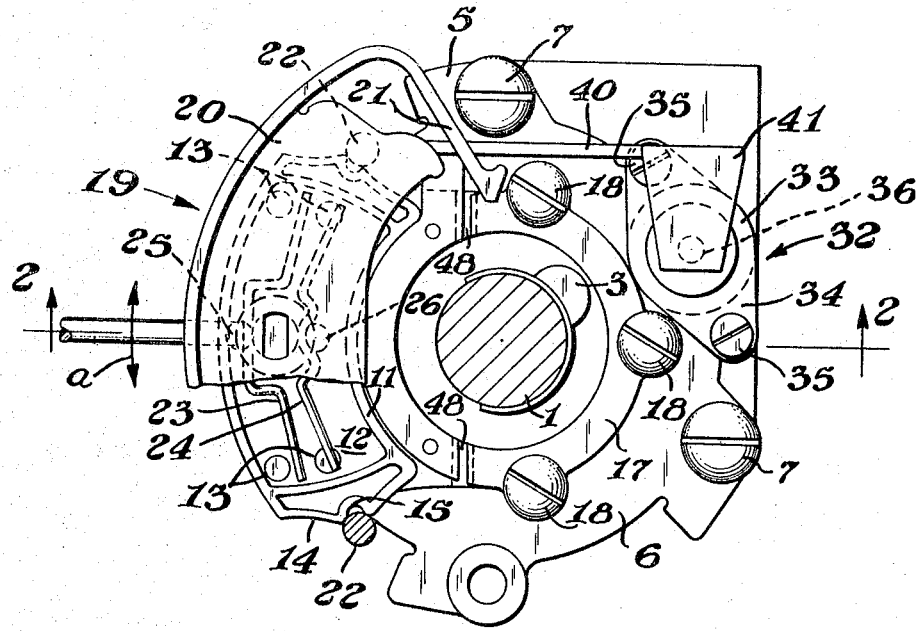
FIGURE 1 is a fragmentary top plan view, partly in section, of apparatus constructed in accordance with the invention.

A switch constructed in accordance with the invention is adapted for use in conjunction with a motor vehicle having a rotatable steering shaft 1 which extends through a hollow column (not shown) that terminates at its upper end in a housing 2 in which the shaft 1 is journaled by means of bearings (not shown). The shaft 1 extends completely through the housing 2 and is provided at its upper end with a steering wheel (not shown). The shaft also is provided with one or more radially projecting cams 3 which move through a circular path in response to rotation of the shaft 1.

The housing 2 comprises an annular sleeve 4 to which is joined a pair of radially outwardly extending flanges 5 and 6 through which extends a plurality of screws 7 by means of which the housing may be secured to the steering column. The sleeve 4 also is provided with another flange 8 (FIGURE 2) to which is secured an upstanding, semicylindrical socket member 9.

Mounted on the housing 2 is a switch base or support 10 of the kind disclosed in Patent No. 3,171,910 and comprising an arcuate casing 11 formed of electrically non-conductive material such as nylon and having a bottom wall 12 in which is mounted a plurality of switch contacts 13 which may be connected to the direction signaling lamps (not shown) of the vehicle. At each end of the casing 11 is a flexible rib 14 having a centrally located notch 15. Secured to and preferably formed integrally with the casing 11 is an annular pliable or flexible mounting ring 16 which is mounted atop the sleeve 4 and is secured to the latter by an arcuate, metal bar 17 which overlies a little more than one-half the ring. The bar 17 and the adjacent portion of the ring 16 are apertured to accommodate securing screws 18 which are threaded into openings formed in the sleeve 4.

A direction signal actuating member 19 of the kind shown in the aforementioned patent is mounted on the support 10 and comprises an arcuate body 20 formed of nylon or the like and terminating at its ends in flexible fingers 21 which extend toward the steering shaft 1 so as to be capable of being projected into the path of rotation of the cam 3. Adjacent each end of the body 20 is a depending detent or stud 22 which cooperates with the associated flexible rib 14 so as yieldably to maintain the actuating member 19 in any one of a number of positions of adjustment relative to the casing 11.

The body 20 of the actuating member 19 is provided on its undersurface with a pair of switching members 23 and 24 which are adapted to engage and disengage selected ones of the contacts 13, as is explained more fully in the aforementioned patent. The switching members 23 and 24 are constantly in engagement with electrical contacts 25 and 26, respectively, which may be connected to a battery (not shown) or other source of energy and to a flasher unit (not shown) of known construction.

The actuating member 19 is mounted for rocking movements about an axis located substantially midway between the ends of the arcuate casing 11 by means of a mounting post 27 having a cylindrical portion 28 at one end that is accommodated in the socket member 9. The post 27 also includes an intermediate, reduced cylindrical portion 29 which rotatably extends through an opening formed in the casing 11, and terminates at its other end in a substantially rectangular portion 30 which extends through a correspondingly shaped opening in the actuator body 20. The free end of the portions 30 may be peened over or provided with a headed screw or the like (not shown) to maintain the mounting member 27 assembled with the parts 11 and 20. Threaded or otherwise fixed to the post 27 is one end of operating handle means 31 by means of which the post 27, and the actuating member 19, may be rocked.

The construction and arrangement of the mounting means are such that rotation of the post 27 in one direction, indicated by the arrow a in FIGURE 1, will cause corresponding rocking of the actuating member 19 from the neutral position illustrated in FIGURE 1 to an operating position in which the switching members 23 and 24 engage selected contacts 13 so as to operate the direction signals at one side or the other of the vehicle. Such rocking of the actuating member 19 will position one or the other of the return fingers 21 in the path of rotation of the cam 3 so as to condition the actuating member for automatic restoration to its neutral position in response to rotation of the steering shaft.

A second switch device 32 is mounted on the housing 2 and preferably corresponds to the construction disclosed in copending application Ser. No. 247,110, filed Dec. 26, 1962, and to which reference is made for a more detailed description of its operation. Briefly, however, the switch 32 comprises an annular housing 33 to which is secured a flange 34. Extending through the flange 34 is a number of mounting screws 35 which are threaded into the housing flange 6. Within the housing 33 are fixed contacts (not shown) and movable contact means (not shown) which move into and out of engagement with the fixed contacts in response to axial movement of a plunger 36 which extends above the housing 33 and is spring biased to its projected position.

Figure 2:
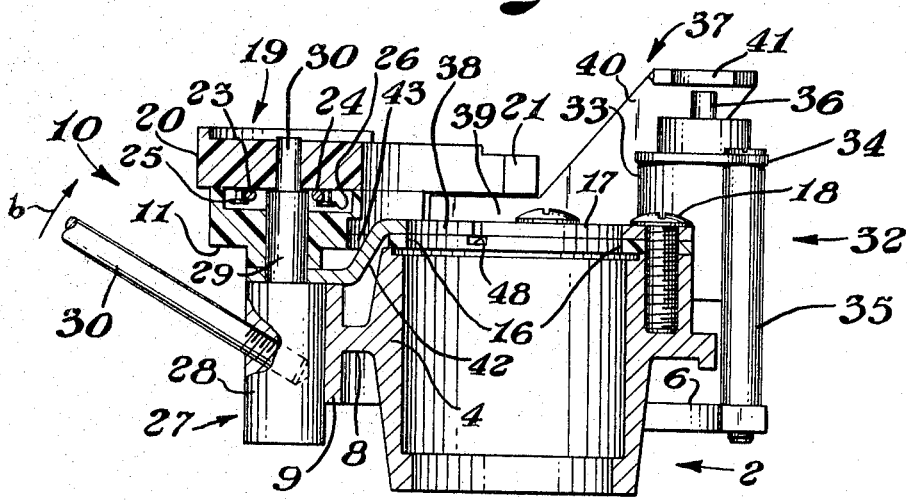
FIGURE 2 is a transverse sectional view taken on the line 2—2 of FIGURE 1, but with the vehicle's steering shaft omitted and illustrating the apparatus in its neutral or inactive position.

An operating member for operating the switch 32 is designated generally by the reference character 37 (see FIGURE 5) and comprises a semicircular, metal bar 38 which overlies a portion of the mounting ring 16 of the switch support 10. If desired, the bar 38 may be staked to the ring 16. The arcuate length of the bar 38 is such that its ends confront but terminate short of the ends of the bar 17, as is best shown in FIGURES 1, 2 and 3. To one side of the bar 38 is joined one end of an operating arm 39 which includes an upwardly inclined portion 40 that terminates in a laterally bent flange 41 which overlies the operating plunger of the switch 32.

Midway between the ends of the arcuate bar 38 is a radially outwardly and downwardly inclined flange 42 which extends through an opening 43 formed in the ring 16 and terminates in a substantially horizontal end section 44 in which is formed a cylindrical opening 45 that rotatably accommodates the intermediate portion 29 of the mounting post 27. The terminal portion 44 has a laterally extending flange 46 to which is secured one end of a tension spring 47, the opposite end of which may be secured to the flange 5 of the housing 2.

The construction and arrangement of the operating member 37 are such that rocking of the operating handle 31 is in the direction of the arrow b in FIGURE 2 will cause the mounting ring 16 to be flexed between the bars 17 and 38 so as to permit rocking of the operating member 37 clockwise about an axis passing through the member 16 between the bars 17 and 38 from the position shown in FIGURE 2 to the position shown in FIGURE 3 in which the flange 41 engages and depresses the operating plunger 36 of the switch 32. Upon engagement and depression of the plunger 36 by the flange 41, the movable contacts of the switch 32 will either engage or disengage the fixed contacts so as to energize or deenergize the electrically operated apparatus controlled by the switch 32. If the switch 32 is connected to the vehicle's high beam head lamps, such head lamps will be turned off and on in response to operation of the switch.

Following engagement and depression of the plunger 36 by the flange 41, the vehicle operator may release the operating means 31, whereupon the spring 47 will restore the apparatus to its normal or inactive position, as is indicated in FIGURE 2, the ring 16 again flexing about the aforementioned axis. Preferably, the mounting ring 16 is provided with a pair of opposed notches 48 in its upper surface to facilitate flexing of the ring.

The actuating member 19 may be rocked about the longitudinal axis of the mounting post 27 so as to control the direction signaling devices without having any effect on the switch 32. Conversely, the mounting post 27 may be manipulated so as to effect operation of the switch 32 without any effect on the direction signal actuating means. Moreover, the switch 32 may be operated in any of the three positions of the direction signal operating means.

The disclosed embodiment is representative of a presently preferred form of the invention, but is intended to be illustrative rather than definitive thereof. The invention is defined in the claims.

We claim:

1. A switch construction comprising a support member; pliable means mounting said support member for rocking movement about an axis passing through said pliable means; an operating member connected to said support member for rocking movements therewith; first switch means; means mounting said first switch means for engagement by said operating member in response to rocking of the latter about said axis; actuating means; means mounting said actuating means on said support member for rocking movement with the latter and relative to said support member about a second axis; second switch means; and means mounting said second switch means for operation in response to rocking movement of said actuating means about said second axis.

2. The construction set forth in claim 1 including operating means connected to said support member and to said actuating means for rocking said support member and said actuating means.

3. Vehicle direction signaling apparatus comprising a support member; an actuating member mounted on said support member for rocking movements about a first axis from a neutral position to an operating position on either one of two sides of said neutral position; cooperable direction signaling switch means on said members engageable in response to movement of said actuating member to either of said operating positions; pliable means forming part of said support member and mounting the latter for rocking movements about a second axis; a switch operating member connected to said support member for movement in an arcuate path in response to rocking of said support member; and switch means mounted in the path of movement of said operating member for operation thereby in response to rocking of said support means about said second axis.

4. The apparatus set forth in claim 3 including operating means connected to said actuating member for rocking the latter about said first axis.

5. The apparatus set forth in claim 3 including operating means connected to said support member for rocking the latter about said second axis.

6. The apparatus set forth in claim 3 including operating means connected to said actuating member and to said support member and being operable to rock each of said members about its respective axis independently of the other of said members.

7. The construction set forth in claim 3 including spring means connected to said support member and constantly biasing the latter in one direction.

8. A dual switch construction comprising a base; switch contacts supported on said base; an actuating member; means mounting said actuating member on said base for movement relative thereto; switch means connected to said actuating member for movement therewith into and out of engagement with said switch contacts; a switch operating member; second switch means mounted in a position to be engaged by said switch operating member; and operating means connected to said actuating member and to said switch operating member for moving either one or both of said members, said base comprising a pliable portion about which said base is bendable from a normal position in response to operation of said operating means to move said switch operating member into engagement with said second switch means.

9. The construction set forth in claim 8 including spring means acting on said base and urging the latter to bend about said pliable portion to said normal position.

References Cited

UNITED STATES PATENTS

| | | | |
|---|---|---|---|
| 2,547,765 | 4/1951 | Lund | 200—153 X |
| 2,794,088 | 5/1957 | Ostby | 200—153 X |
| 3,030,465 | 4/1962 | Roeser | 200—153 X |

FOREIGN PATENTS

| | | |
|---|---|---|
| 930,875 | 7/1963 | Great Britain. |
| 960,981 | 6/1964 | Great Britain. |

BERNARD A. GILHEANY, *Primary Examiner.*

H. A. LEWITTER, *Assistant Examiner.*